US011144919B2

(12) United States Patent
Bhasin et al.

(10) Patent No.: US 11,144,919 B2
(45) Date of Patent: Oct. 12, 2021

(54) SYSTEM, METHOD, AND COMPUTER PROGRAM PRODUCT FOR GUARANTEEING A PAYMENT AUTHORIZATION RESPONSE

(71) Applicant: Visa International Service Association, San Francisco, CA (US)

(72) Inventors: Gurpreet Singh Bhasin, Fremont, CA (US); Biju Abraham, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/655,793

(22) Filed: Oct. 17, 2019

(65) Prior Publication Data
US 2021/0117968 A1    Apr. 22, 2021

(51) Int. Cl.
*G06Q 20/40*      (2012.01)
*G06Q 40/08*      (2012.01)

(52) U.S. Cl.
CPC ........... *G06Q 20/40* (2013.01); *G06Q 40/08* (2013.01)

(58) Field of Classification Search
CPC .............................. G06Q 20/40; G06Q 40/08
USPC ...................................................... 705/3–44
See application file for complete search history.

(56) References Cited

U.S. PATENT DOCUMENTS

| 7,809,650 | B2 * | 10/2010 | Bruesewitz | G06Q 20/382 |
| | | | | 705/64 |
| 7,959,074 | B1 | 6/2011 | Chopra et al. | |
| 8,380,629 | B2 * | 2/2013 | Carlson | G06Q 20/10 |
| | | | | 705/44 |
| 8,442,894 | B2 | 5/2013 | Blackhurst et al. | |
| 8,620,798 | B2 * | 12/2013 | Faith | G06Q 20/40 |
| | | | | 705/38 |

(Continued)

OTHER PUBLICATIONS

"Visa USA Launches breakthrough Anti-Fraud Technology", PR NewsWire Association LLC, Jun. 13, 2009.*

(Continued)

*Primary Examiner* — Frantzy Poinvil
(74) *Attorney, Agent, or Firm* — The Webb Law Firm

(57) ABSTRACT

Provided are computer-implemented methods for guaranteeing a payment authorization response. Computer-implemented methods may include determining that a payment authorization response message for a payment transaction was not received from a transaction service provider system within a predetermined period of time after a payment authorization request message for the payment transaction was transmitted to the transaction service provider system; generating a supplemental payment authorization request message for the payment transaction based on the payment authorization request message; determining that the payment transaction is authorized based on a quantitative risk score associated with the supplemental payment authorization request message and an insurer rate associated with the supplemental payment authorization request message; and transmitting a supplemental payment authorization response message to a merchant system based on determining that the payment transaction is authorized. Systems and computer program products are also provided.

18 Claims, 5 Drawing Sheets

(56) References Cited

U.S. PATENT DOCUMENTS

| | | | | |
|---|---|---|---|---|
| 8,630,954 B2* | 1/2014 | Thaw | ................ | G06Q 10/02 |
| | | | | 705/44 |
| 8,751,381 B2* | 6/2014 | Musser | ............ | G06Q 20/40 |
| | | | | 705/39 |
| 8,825,517 B2* | 9/2014 | Hammad | ........ | G06Q 20/3278 |
| | | | | 705/13 |
| 2005/0279827 A1 | 12/2005 | Mascavage et al. | | |
| 2011/0066493 A1* | 3/2011 | Faith | ............ | G06Q 30/0251 |
| | | | | 705/14.49 |
| 2012/0330787 A1* | 12/2012 | Hanson | ............ | G06Q 30/00 |
| | | | | 705/26.41 |
| 2013/0085800 A1* | 4/2013 | Radkowski | ...... | G06Q 10/0635 |
| | | | | 705/7.28 |
| 2013/0282488 A1* | 10/2013 | Blum | ............ | G06Q 30/0601 |
| | | | | 705/14.53 |
| 2014/0164254 A1* | 6/2014 | Dimmick | .......... | G06Q 20/36 |
| | | | | 705/71 |
| 2015/0046339 A1* | 2/2015 | Wong | ............ | G06Q 20/3829 |
| | | | | 705/71 |
| 2015/0199689 A1* | 7/2015 | Kumnick | ........ | G06Q 20/4016 |
| | | | | 705/67 |
| 2015/0339664 A1* | 11/2015 | Wong | ............ | H04W 12/069 |
| | | | | 705/71 |
| 2015/0371229 A1* | 12/2015 | Prakash | .......... | G06Q 20/3278 |
| | | | | 705/44 |
| 2015/0372811 A1* | 12/2015 | Le Saint | ............ | H04L 9/3228 |
| | | | | 705/76 |
| 2016/0104133 A1* | 4/2016 | Davis | ................ | G06Q 50/01 |
| | | | | 705/39 |
| 2016/0180325 A1* | 6/2016 | Davis | ............ | G06Q 20/325 |
| | | | | 705/44 |

OTHER PUBLICATIONS

Al-Dala, et al., "Using a Mobile Device to Enhance Customer Trust in the Security of Remote Transactions", The University of Newcastle, Callaghan NSW 2308, Australia, (Year: 2008).*

"Merchant Guarantee Guide". Worldpay, Jun. 2014, http://support.worldpay.com/support/kb/bg/guarantee/ga0000.html, 1 page.

Uriarte, "Guaranteed Fraud Prevention Solutions: Maybe Some Things in Life Are Guaranteed?", Glenbrook, Jan. 24, 2017, https://pv.glenbrook.comiguaranteed-fraud-prevention-solutions-maybe-some-things-in-life-are-guaranteed/, 2 pages.

* cited by examiner

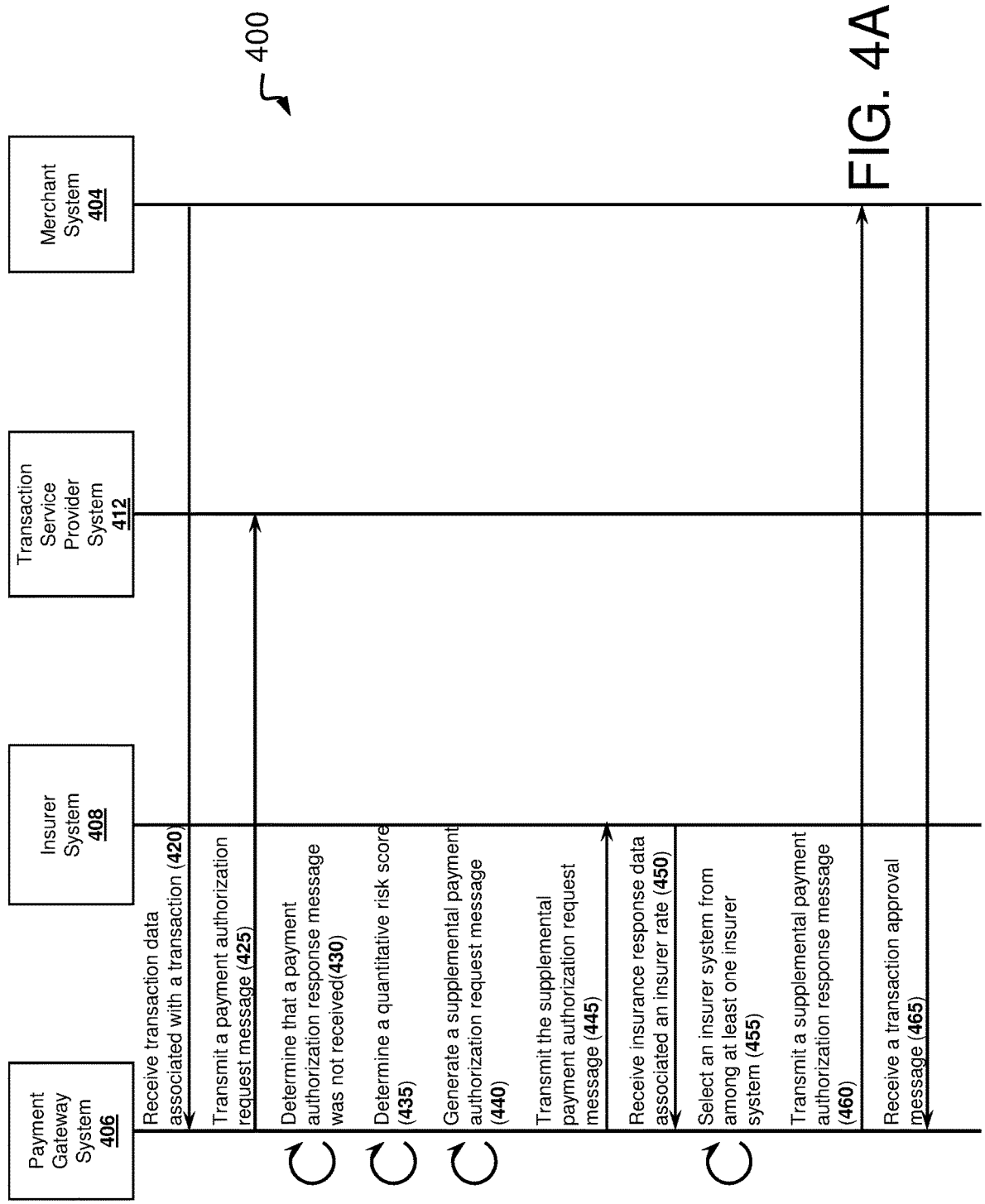

SYSTEM, METHOD, AND COMPUTER PROGRAM PRODUCT FOR GUARANTEEING A PAYMENT AUTHORIZATION RESPONSE

BACKGROUND

1. Technical Field

This disclosure relates generally to guaranteeing a payment authorization response and, in some non-limiting embodiments or aspects, to systems, methods, and computer program products for guaranteeing a payment authorization response during an e-commerce transaction.

2. Technical Considerations

During a payment transaction, a merchant system may receive an indication of whether the payment transaction is approved or denied. For example, the merchant system may generate transaction data associated with a payment transaction (e.g., a value for a transaction, an account identifier for an account maintained by an issuer system to be used to settle the transaction, and/or the like) and transmit the transaction data associated with the payment transaction to a payment gateway system that in turn, transmits the transaction data to a transaction service provider system. The transaction service provider system may then communicate (e.g., transmit a message and receive a response to the message) with an issuer system to determine whether the transaction is authorized or denied. Based on communicating with the issuer system, the transaction service provider system may transmit a message to the payment gateway system indicating that the transaction is approved or denied. The payment gateway system, in turn, may transmit the message to the merchant system indicating that the transaction is approved or denied.

In some instances, however, the payment gateway system may not be able to establish communication with the transaction service provider system and/or the transaction service provider system may not be able to establish communication with the issuer system. In such cases, the payment gateway system may transmit a message to the merchant system indicating that the transaction could not be processed (e.g., an error response and/or a timeout response). The merchant system may then either retransmit the transaction data to re-initiate the transaction or receive the information about the transaction, generate new transaction data associated with the transaction, and transmit the new transaction data to the payment gateway to initiate another transaction. These repeated attempts to solicit a response indicating whether the transaction is approved or not approved may cause the merchant system and the payment gateway system to expend resources unnecessarily, while also expending computational resources that would otherwise be used to process incoming transaction data.

SUMMARY

Accordingly, disclosed are improved systems, methods, and computer-program products for guaranteeing a payment authorization response.

According to some non-limiting embodiments or aspects, provided is a computer-implemented method for guaranteeing a payment authorization response during an e-commerce transaction. The method may include determining, with at least one processor, that a payment authorization response message for a payment transaction was not received from a transaction service provider system within a predetermined period of time after a payment authorization request message for the payment transaction was transmitted to the transaction service provider system; in response to determining that the payment authorization response message for the payment transaction was not received, generating, with at least one processor, a supplemental payment authorization request message for the payment transaction based on the payment authorization request message; in response to generating the supplemental payment authorization request message, determining, with at least one processor, that the payment transaction is authorized based on a quantitative risk score associated with the supplemental payment authorization request message and an insurer rate associated with the supplemental payment authorization request message; and transmitting, with at least one processor, a supplemental payment authorization response message to a merchant system based on determining that the payment transaction is authorized.

In some non-limiting embodiments or aspects, the computer-implemented method may include transmitting, with at least one processor, the supplemental payment authorization request message to a plurality of insurer systems; receiving, with at least one processor, insurance response data associated with insurer rates for which the plurality of insurer systems guarantees payment of the payment transaction; and selecting, with at least one processor, an insurer system from among the plurality of insurer systems to insure the payment transaction based on the insurer rates. For example, determining that the supplemental payment authorization request message is authorized may include transmitting, with at least one processor, the supplemental payment authorization request message to at least one insurer system; receiving, with at least one processor, insurance response data associated with an insurer rate for which the insurer system guarantees payment of the payment transaction; and selecting, with at least one processor, an insurer system from among the at least one insurer system to insure the payment transaction based on the insurer rate.

In some non-limiting embodiments or aspects, the method may include receiving, with at least one processor, a transaction approval message from the merchant system based on the supplemental payment authorization response message; determining, with at least one processor, that the payment transaction is approved by the merchant; and processing, with at least one processor, the payment transaction.

In some non-limiting embodiments or aspects, the method may include re-transmitting, with at least one processor, the payment authorization request message to the transaction service provider system after transmitting the supplemental payment authorization response message to the merchant system; receiving, with at least one processor, a payment authorization response message from the transaction service provider system; and transmitting, with at least one processor, a confirmation message to the merchant system based on the payment authorization response message. In some non-limiting embodiments or aspects, the method may include re-transmitting, with at least one processor, the payment authorization request message to the transaction service provider system; receiving, with at least one processor, a payment response message from the transaction service provider system indicating that the payment transaction is denied; and transmitting, with at least one processor, an insurance claim message for the payment transaction to the insurer system. For example, processing the payment transaction may include re-transmitting, with at least one processor, the payment authorization request message to the transaction service provider system after transmitting the supplemental payment authorization response message to the merchant system; receiving, with at least one processor, a payment authorization response message from the transaction service provider system; and transmitting, with at least one processor, a confirmation message to the merchant system based on the payment authorization response message. In some non-limiting embodiments or aspects, the method may include re-transmitting, with at least one processor, the payment authorization request message to the transaction service provider system; receiving, with at least one processor, a payment response message from the transaction service provider system indicating that the payment transaction is denied; and transmitting, with at least one processor, an insurance claim message for the payment transaction to the selected insurer system.

In some non-limiting embodiments or aspects, the method may include determining, with at least one processor, that the quantitative risk score corresponds to an accepted risk score value for payment transactions processed by the merchant system and that the insurer rate associated with the supplemental payment authorization request message corresponds to an accepted insurer rate value. For example, determining that the payment transaction is authorized based on the quantitative risk score associated with the supplemental payment authorization request message and the insurer rate associated with the supplemental payment authorization request message may include determining, with at least one processor, that the quantitative risk score corresponds to an accepted risk score value for payment transactions processed by the merchant system and that the insurer rate associated with the supplemental payment authorization request message corresponds to an accepted insurer rate value.

In some non-limiting embodiments or aspects, the method may include aggregating, with at least one processor, a plurality of payment authorization request messages for a plurality of payment transactions for which payment authorization response messages were not received from the transaction service provider system; determining, with at least one processor, that the payment authorization response messages were received; and generating, with at least one processor, the supplemental payment authorization request message based on determining that the payment authorization response messages were not received, wherein the supplemental payment authorization request message comprises the quantitative risk score and the insurer rate, the quantitative risk score and the insurer rate determined based on the plurality of payment authorization request messages.

In some non-limiting embodiments or aspects, generating the supplemental payment authorization request message for the payment transaction based on the payment authorization request message may include aggregating, with at least one processor, a plurality of payment authorization request messages for a plurality of payment transactions for which payment authorization response messages were not received from the transaction service provider system; determining, with at least one processor, that the payment authorization response messages were received; and generating, with at least one processor, the supplemental payment authorization request message based on determining that the payment authorization response messages were not received, wherein the supplemental payment authorization request message comprises the quantitative risk score and the insurer rate, the quantitative risk score and the insurer rate determined based on the plurality of payment authorization request messages.

According to some non-limiting embodiments or aspects provided are systems for guaranteeing a payment authorization response during an e-commerce transaction. The systems may include at least one processor programmed or configured to determine that a payment authorization response message for a payment transaction was not received from a transaction service provider system within a predetermined period of time after a payment authorization request message for the payment transaction was transmitted to the transaction service provider system; generate a supplemental payment authorization request message for the payment transaction based on the payment authorization request message; transmit the supplemental payment authorization request message to a plurality of insurer systems; receive insurance response data associated with insurer rates for which the plurality of insurer systems guarantees payment of the payment transaction; select an insurer system from among the plurality of insurer systems to insure the payment transaction based on the insurer rates; determine that the payment transaction is authorized based on a quantitative risk score associated with the supplemental payment authorization request message and the insurer rate associated with the supplemental payment authorization request message; and transmit a supplemental payment authorization response message to a merchant system based on determining that the payment transaction is authorized, the supplemental payment authorization response message comprising: the insurance response data associated with an insurer rate for which the selected insurer system guarantees payment of the payment transaction.

In some non-limiting embodiments or aspects, the at least one processor of the system may be further programmed or configured to receive a transaction approval message from the merchant system based on the supplemental payment authorization response message; determine that the payment transaction is approved by a merchant associated with the merchant system; and process the payment transaction.

In some non-limiting embodiments or aspects, when processing the payment transaction, the at least one processor is programmed or configured to re-transmit the payment authorization request message to the transaction service provider system after transmitting the supplemental payment authorization response message to the merchant system; receive a payment authorization response message from the transaction service provider system including an indication that the payment transaction is authorized; and transmit a confirmation message to the merchant system based on the payment authorization response message.

In some non-limiting embodiments or aspects, when processing the payment transaction, the at least one processor is programmed or configured to re-transmit the payment authorization request message to the transaction service provider system; receive a payment response message from the transaction service provider system including an indication that the payment transaction is denied; and transmit an insurance claim message for the payment transaction to the selected insurer system.

In some non-limiting embodiments or aspects, when determining that the payment transaction is authorized based on the quantitative risk score associated with the supplemental payment authorization request message and the insurer rate associated with the supplemental payment authorization request message, the at least one processor is programmed or configured to: determine that the quantitative risk score corresponds to an accepted risk score value for payment transactions processed by the merchant system and that the insurer rate associated with the supplemental payment authorization request message corresponds to an accepted insurer rate value.

In some non-limiting embodiments or aspects, when generating the supplemental payment authorization request message for the payment transaction based on the payment authorization request message, the at least one processor is programmed or configured to: aggregate a plurality of payment authorization request messages for a plurality of payment transactions for which payment authorization response messages were not received from the transaction service provider system; and determine that the payment authorization response messages were received; generate the supplemental payment authorization request message based on determining that the payment authorization response messages were not received, wherein the supplemental payment authorization request message comprises the quantitative risk score and the insurer rate.

According to some non-limiting embodiments or aspects provided are computer program products for guaranteeing a payment authorization response during an e-commerce transaction. The computer program products may include at least one non-transitory computer-readable medium including one or more instructions that, when executed by at least one processor, may cause the at least one processor to determine that a payment authorization response message for a payment transaction was not received from a transaction service provider system after a predetermined period of time has elapsed; in response to determining that the payment authorization response message for the payment transaction was not received, generate a supplemental payment authorization request message for the payment transaction based on a payment authorization request message; in response to generating the supplemental payment authorization request message, transmit the supplemental payment authorization request message to a plurality of insurer systems; determine that the payment transaction is authorized based on a quantitative risk score associated with the supplemental payment authorization request message and an insurer rate associated with the supplemental payment authorization request message; and transmit a supplemental payment authorization response message to a merchant system based on determining that the payment transaction is authorized, the supplemental payment authorization response message comprising: insurance response data associated with an insurer rate for which an insurer system of the plurality of insurer systems guarantees payment of the payment transaction.

In some non-limiting embodiments or aspects, the one or more instructions may further cause the at least one processor to receive insurance response data associated with insurer rates for which the plurality of insurer systems guarantees payment of the payment transaction; and select the insurer system from among the plurality of insurer systems to insure the payment transaction based on the insurer rates.

In some non-limiting embodiments or aspects, the one or more instructions may further cause the at least one processor to receive a transaction approval message from the merchant system based on the supplemental payment authorization response message; determine that the payment transaction is approved by a merchant associated with the merchant system; and process the payment transaction.

In some non-limiting embodiments or aspects, the one or more instructions may further cause the at least one processor to re-transmit the payment authorization request message to the transaction service provider system after transmitting the supplemental payment authorization response message to the merchant system; receive a payment authorization response message from the transaction service provider system including an indication that the payment transaction is approved; and transmit a confirmation message to the merchant system based on the payment authorization response message. For example, the one or more instructions that cause the at least one processor to process the payment transaction may cause the at least one processor to re-transmit the payment authorization request message to the transaction service provider system a further predetermined period of time after transmitting the supplemental payment authorization response message to the merchant system; receive a payment authorization response message from the transaction service provider system; and transmit a confirmation message to the merchant system based on the payment authorization response message.

In some non-limiting embodiments or aspects, the one or more instructions may cause the at least one processor to: re-transmit the payment authorization request message to the transaction service provider system; receive a payment response message from the transaction service provider system including an indication that the payment transaction is denied; and transmit an insurance claim message for the payment transaction to the insurer system. For example, the one or more instructions that cause the at least one processor to process the payment transaction may further cause the at least one processor to re-transmit the payment authorization request message to the transaction service provider system; receive a payment response message from the transaction service provider system indicating that the payment transaction is denied; and transmit an insurance claim message for the payment transaction to the insurer system.

In some non-limiting embodiments or aspects, the one or more instructions may further cause the at least one processor to determine that the quantitative risk score corresponds to an accepted risk score value for payment transactions processed by the merchant system and that the insurer rate associated with the supplemental payment authorization request message corresponds to an accepted insurer rate value. For example, the one or more instructions that cause the at least one processor to determine that the payment transaction is authorized based on the quantitative risk score associated with the supplemental payment authorization request message and the insurer rate associated with the supplemental payment authorization request message cause the at least one processor to: determine that the quantitative risk score corresponds to an accepted risk score value for payment transactions processed by the merchant system and that the insurer rate associated with the supplemental payment authorization request message corresponds to an accepted insurer rate value.

In some non-limiting embodiments or aspects, the one or more instructions may further cause the at least one processor to aggregate a plurality of payment authorization request messages for a plurality of payment transactions for which payment authorization response messages were not received from the transaction service provider system; determine that the payment authorization response messages were received; and generate the supplemental payment authorization request message based on determining that the payment authorization response messages were not received, wherein the supplemental payment authorization request message comprises the quantitative risk score and the insurer rate. For example, the one or more instructions that cause the at least one processor to generate the supplemental payment authorization request message for the payment transaction based on the payment authorization request may cause the at least one processor to determine that the quantitative risk score corresponds to an accepted risk score value for payment transactions processed by the merchant system and that the insurer rate associated with the supplemental payment authorization request message corresponds to an accepted insurer rate value.

In some non-limiting embodiments or aspects, the one or more instructions may further cause the at least one processor to aggregate a plurality of payment authorization request messages for a plurality of payment transactions for which payment authorization response messages were not received from the transaction service provider system; determine that the payment authorization response messages were received; and generate the supplemental payment authorization request message based on determining that the payment authorization response messages were not received, wherein the supplemental payment authorization request message comprises the quantitative risk score and the insurer rate.

Further non-limiting embodiments or aspects are set forth in the following numbered clauses:

Clause 1: A computer-implemented method for guaranteeing a payment authorization response during an e-commerce transaction, the computer-implemented method comprising: determining, with at least one processor, that a payment authorization response message for a payment transaction was not received from a transaction service provider system within a predetermined period of time after a payment authorization request message for the payment transaction was transmitted to the transaction service provider system; in response to determining that the payment authorization response message for the payment transaction was not received, generating, with at least one processor, a supplemental payment authorization request message for the payment transaction based on the payment authorization request message; in response to generating the supplemental payment authorization request message, determining, with at least one processor, that the payment transaction is authorized based on a quantitative risk score associated with the supplemental payment authorization request message and an insurer rate associated with the supplemental payment authorization request message; and transmitting, with at least one processor, a supplemental payment authorization response message to a merchant system based on determining that the payment transaction is authorized.

Clause 2: The computer-implemented method according to clause 1, wherein determining that the supplemental payment authorization request message is authorized comprises: transmitting, with at least one processor, the supplemental payment authorization request message to a plurality of insurer systems; receiving, with at least one processor, insurance response data associated with insurer rates for which the plurality of insurer systems guarantees payment of the payment transaction; and selecting, with at least one processor, an insurer system from among the plurality of insurer systems to insure the payment transaction based on the insurer rates.

Clause 3: The computer-implemented method according to clauses 1 or 2, further comprising: receiving, with at least one processor, a transaction approval message from the merchant system based on the supplemental payment authorization response message; determining, with at least one processor, that the payment transaction is approved by the merchant; and processing, with at least one processor, the payment transaction.

Clause 4: The computer-implemented method according to any of clauses 1-3, wherein processing the payment transaction comprises: re-transmitting, with at least one processor, the payment authorization request message to the transaction service provider system after transmitting the supplemental payment authorization response message to the merchant system; receiving, with at least one processor, a payment authorization response message from the transaction service provider system; and transmitting, with at least one processor, a confirmation message to the merchant system based on the payment authorization response message.

Clause 5: The computer-implemented method according to any of clauses 1-4, wherein processing the payment transaction comprises: re-transmitting, with at least one processor, the payment authorization request message to the transaction service provider system; receiving, with at least one processor, a payment response message from the transaction service provider system indicating that the payment transaction is denied; and transmitting, with at least one processor, an insurance claim message for the payment transaction to the selected insurer system.

Clause 6: The computer-implemented method according to any of clauses 1-5, wherein determining that the payment transaction is authorized based on the quantitative risk score associated with the supplemental payment authorization request message and the insurer rate associated with the supplemental payment authorization request message comprises: determining, with at least one processor, that the quantitative risk score corresponds to an accepted risk score value for payment transactions processed by the merchant system and that the insurer rate associated with the supplemental payment authorization request message corresponds to an accepted insurer rate value.

Clause 7: The computer-implemented method according to any of clauses 1-6, wherein generating the supplemental payment authorization request message for the payment transaction based on the payment authorization request message comprises: aggregating, with at least one processor, a plurality of payment authorization request messages for a plurality of payment transactions for which payment authorization response messages were not received from the transaction service provider system; determining, with at least one processor, that the payment authorization response messages were received; and generating, with at least one processor, the supplemental payment authorization request message based on determining that the payment authorization response messages were not received, wherein the supplemental payment authorization request message comprises the quantitative risk score and the insurer rate, the quantitative risk score and the insurer rate determined based on the plurality of payment authorization request messages.

Clause 8: A system for guaranteeing a payment authorization response during an e-commerce transaction, the system comprising: at least one processor programmed or configured to: determine that a payment authorization response message for a payment transaction was not received from a transaction service provider system within a predetermined period of time after a payment authorization request message for the payment transaction was transmitted to the transaction service provider system; generate a supplemental payment authorization request message for the payment transaction based on the payment authorization request message; transmit the supplemental payment authorization request message to a plurality of insurer systems; receive insurance response data associated with insurer rates for which the plurality of insurer systems guarantees payment of the payment transaction; select an insurer system from among the plurality of insurer systems to insure the payment transaction based on the insurer rates; determine that the payment transaction is authorized based on a quantitative risk score associated with the supplemental payment authorization request message and the insurer rate associated with the supplemental payment authorization request message; and transmit a supplemental payment authorization response message to a merchant system based on determining that the payment transaction is authorized, the supplemental payment authorization response message comprising: the insurance response data associated with an insurer rate for which the selected insurer system guarantees payment of the payment transaction.

Clause 9: The system according to clause 8, wherein the at least one processor is further programmed or configured to: receive a transaction approval message from the merchant system based on the supplemental payment authorization response message; determine that the payment transaction is approved by a merchant associated with the merchant system; and process the payment transaction.

Clause 10: The system according to clauses 8 or 9, wherein, when processing the payment transaction, the at least one processor is programmed or configured to: re-transmit the payment authorization request message to the transaction service provider system after transmitting the supplemental payment authorization response message to the merchant system; receive a payment authorization response message from the transaction service provider system including an indication that the payment transaction is authorized; and transmit a confirmation message to the merchant system based on the payment authorization response message.

Clause 11: The system according to any of clauses 8-10, wherein, when processing the payment transaction, the at least one processor is programmed or configured to: re-transmit the payment authorization request message to the transaction service provider system; receive a payment response message from the transaction service provider system including an indication that the payment transaction is denied; and transmit an insurance claim message for the payment transaction to the selected insurer system.

Clause 12: The system according to any of clauses 8-11, wherein, when determining that the payment transaction is authorized based on the quantitative risk score associated with the supplemental payment authorization request message and the insurer rate associated with the supplemental payment authorization request message, the at least one processor is programmed or configured to: determine that the quantitative risk score corresponds to an accepted risk score value for payment transactions processed by the merchant system and that the insurer rate associated with the supplemental payment authorization request message corresponds to an accepted insurer rate value.

Clause 13: The system according to any of clauses 8-12, wherein, when generating the supplemental payment authorization request message for the payment transaction based on the payment authorization request message, the at least one processor is programmed or configured to: aggregate a plurality of payment authorization request messages for a plurality of payment transactions for which payment authorization response messages were not received from the transaction service provider system; and determine that the payment authorization response messages were received; generate the supplemental payment authorization request message based on determining that the payment authorization response messages were not received, wherein the supplemental payment authorization request message comprises the quantitative risk score and the insurer rate.

Clause 14: A computer program product for guaranteeing a payment authorization response during an e-commerce transaction, the computer program product comprising at least one non-transitory computer-readable medium including one or more instructions that, when executed by at least one processor, cause the at least one processor to: determine that a payment authorization response message for a payment transaction was not received from a transaction service provider system after a predetermined period of time has elapsed; in response to determining that the payment authorization response message for the payment transaction was not received, generate a supplemental payment authorization request message for the payment transaction based on a payment authorization request message; in response to generating the supplemental payment authorization request message, transmit the supplemental payment authorization request message to a plurality of insurer systems; determine that the payment transaction is authorized based on a quantitative risk score associated with the supplemental payment authorization request message and an insurer rate associated with the supplemental payment authorization request message; and transmit a supplemental payment authorization response message to a merchant system based on determining that the payment transaction is authorized, the supplemental payment authorization response message comprising: insurance response data associated with an insurer rate for which an insurer system of the plurality of insurer systems guarantees payment of the payment transaction.

Clause 15: The computer program product according to clause 14, wherein the one or more instructions further cause the at least one processor to: receive insurance response data associated with insurer rates for which the plurality of insurer systems guarantees payment of the payment transaction; and select the insurer system from among the plurality of insurer systems to insure the payment transaction based on the insurer rate.

Clause 16: The computer program product according to clauses 14 or 15, wherein the one or more instructions further cause the at least one processor to: receive a transaction approval message from the merchant system based on the supplemental payment authorization response message; determine that the payment transaction is approved by a merchant associated with the merchant system; and process the payment transaction.

Clause 17: The computer program product according to any of clauses 14-16, wherein the one or more instructions that cause the at least one processor to process the payment transaction cause the at least one processor to: re-transmit the payment authorization request message to the transaction service provider system after transmitting the supplemental payment authorization response message to the merchant system; receive a payment authorization response message from the transaction service provider system including an indication that the payment transaction is approved; and transmit a confirmation message to the merchant system based on the payment authorization response message.

Clause 18: The computer program product according to any of clauses 14-17, wherein the one or more instructions that cause the at least one processor to process the payment transaction cause the at least one processor to: re-transmit the payment authorization request message to the transaction service provider system; receive a payment response message from the transaction service provider system including an indication that the payment transaction is denied; and transmit an insurance claim message for the payment transaction to the insurer system.

Clause 19: The computer program product according to any of clauses 14-18, wherein the one or more instructions that cause the at least one processor to determine that the payment transaction is authorized based on the quantitative risk score associated with the supplemental payment authorization request message and the insurer rate associated with the supplemental payment authorization request message cause the at least one processor to: determine that the quantitative risk score corresponds to an accepted risk score value for payment transactions processed by the merchant system and that the insurer rate associated with the supplemental payment authorization request message corresponds to an accepted insurer rate value.

Clause 20: The computer program product according to any of clauses 14-19, wherein the one or more instructions that cause the at least one processor to generate the supplemental payment authorization request message for the payment transaction based on the payment authorization request message cause the at least one processor to: aggregate a plurality of payment authorization request messages for a plurality of payment transactions for which payment authorization response messages were not received from the transaction service provider system; determine that the payment authorization response messages were received; and generate the supplemental payment authorization request message based on determining that the payment authorization response messages were not received, wherein the supplemental payment authorization request message comprises the quantitative risk score and the insurer rate.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

FIGS. 4A and 4B are diagrams of an implementation of a non-limiting aspect or embodiment of a process for guaranteeing a payment authorization response.

DETAILED DESCRIPTION

Figure 1:
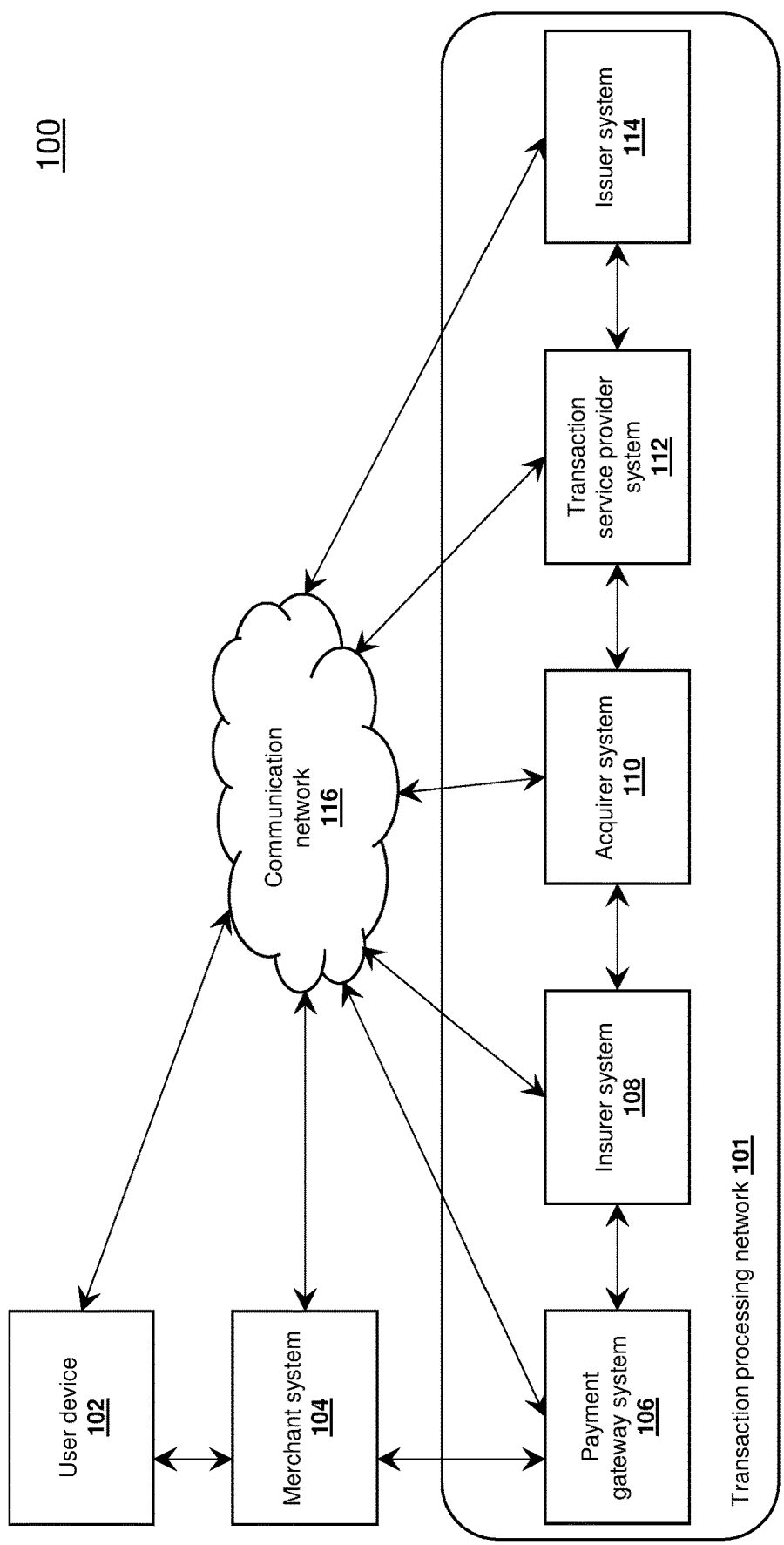
FIG. 1 is a diagram of a non-limiting aspect or embodiment of a system for guaranteeing a payment authorization response.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "payment device" may refer to a payment card (e.g., a credit or debit card), a gift card, a smart card (e.g., a chip card, an integrated circuit card, and/or the like), smart media, a payroll card, a healthcare card, a wristband, a machine-readable medium containing account information, a keychain device or fob, an RFID transponder, a retailer discount or loyalty card, and/or the like. The payment device may include a volatile or a non-volatile memory to store information (e.g., an account identifier, a name of the account holder, and/or the like).

As used herein, the term "computing device" may refer to one or more electronic devices that are configured to directly or indirectly communicate with or over one or more networks. In some non-limiting embodiments or aspects, a computing device may include a mobile device. A mobile device may include a smartphone, a portable computer, a wearable device (e.g., watches, glasses, lenses, clothing, and/or the like), a personal digital assistant (PDA), and/or other like devices. In some non-limiting embodiments or aspects, a computing device may include a server, a desktop computer, and/or the like.

As used herein, the terms "client" and "client device" may refer to one or more computing devices, such as processors, storage devices, and/or similar computer components, that access a service made available by a server. In some non-limiting embodiments or aspects, a "client device" may refer to one or more devices that facilitate payment transactions, such as one or more POS devices used by a merchant. In some non-limiting embodiments or aspects, a client device may include a computing device configured to communicate with one or more networks and/or facilitate payment transactions such as, but not limited to, one or more desktop computers, one or more mobile devices, and/or other like devices. Moreover, a "client" may also refer to an entity, such as a merchant, that owns, utilizes, and/or operates a client device for facilitating payment transactions with a transaction service provider.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or clients.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

In some non-limiting embodiments or aspects, computer-implemented systems, methods, and computer-program products are disclosed for guaranteeing a payment authorization response. For example, computer-implemented methods for guaranteeing a payment authorization response, as described herein, may include determining that a payment authorization response message for a payment transaction was not received from a payment gateway system within a predetermined period of time after a payment authorization request message for the payment transaction was transmitted to the payment gateway system, generating a supplemental payment authorization request message for the payment transaction based on the payment authorization request message, determining that the payment transaction is authorized based on a quantitative risk score associated with the supplemental payment authorization request message and an insurer rate associated with the supplemental payment authorization request message, and transmitting a supplemental payment authorization response message to a merchant system based on determining that the payment transaction is authorized.

By virtue of the embodiments described herein, for example, systems involved in processing a payment transaction may not need to repeat attempts to process a payment transaction when one or more systems involved in the processing of the payment transaction cannot communicate with one or more other systems involved in the processing of the payment transaction. For example, a payment gateway system may communicate with one or more insurer systems where the payment gateway system cannot communicate with a transaction service provider system to ensure authorization of the payment transaction. In such an example, transaction service provider system may determine that a payment transaction is authorized, reducing the need for the payment gateway system to attempt communication with the transaction service provider system to determine that the payment transaction is authorized. Additionally, an authorization response may be obtained by the payment gateway system faster from the insurer system instead of a transaction service provider system where communication with the transaction service provider system is unavailable, thereby decreasing the amount of time needed to process the payment transaction and return a response to the merchant system that transmitted the transaction data associated with the payment transaction to be processed.

Referring now to FIG. 1, FIG. 1 is a diagram of an example environment 100 in which devices, systems, methods, and/or products described herein may be implemented. As shown in FIG. 1, environment 100 includes transaction processing network 101, user device 102, merchant system 104, payment gateway system 106, insurer system 108, acquirer system 110, transaction service provider system 112, and/or issuer system 114. Transaction processing network 101, user device 102, merchant system 104, payment gateway system 106, insurer system 108, acquirer system 110, transaction service provider system 112, and/or issuer system 114 may interconnect (e.g., establish a connection to communicate, and/or the like) via wired connections, wireless connections, or a combination of wired and wireless connections.

User device 102 may include one or more devices capable of being in communication with merchant system 104, payment gateway system 106, insurer system 108, acquirer system 110, transaction service provider system 112, and/or issuer system 114 via communication network 116. For example, user device 102 may include one or more payment devices and/or one or more computing devices such as one or more mobile device, one or more smartphones, one or more wearable devices (e.g., watches, glasses, lenses, clothing, and/or the like), one or more personal digital assistants (PDAs), one or more servers, and/or the like. In some non-limiting embodiments or aspects, user device 102 may communicate via a short-range wireless communication connection (e.g., a wireless communication connection for communicating information in a range between a 2 to 3 centimeters to 5 to 6 meters, such as a NFC communication connection, a RFID communication connection, a Bluetooth® communication connection, and/or the like). In some non-limiting embodiments or aspects, user device 102 may be associated with a user, as described herein.

Merchant system 104 may include one or more device capable of being in communication with user device 102, payment gateway system 106, insurer system 108, acquirer system 110, transaction service provider system 112, and/or issuer system 114 via communication network 116. For example, merchant system 104 may include a computing device, such as a server, a group of servers, and/or other like devices. In some non-limiting embodiments or aspects, merchant system 104 may communicate via a short-range wireless communication connection. In some non-limiting embodiments or aspects, merchant system 104 may be associated with a merchant, as described herein.

Payment gateway system 106 may include one or more device capable of being in communication with user device 102, merchant system 104, insurer system 108, acquirer system 110, transaction service provider system 112, and/or issuer system 114 via communication network 116. For example, payment gateway system 106 may include a computing device, such as a server, a group of servers, and/or other like devices. In some non-limiting embodiments or aspects, payment gateway system 106 may be associated with a payment gateway as described herein.

Insurer system 108 may include one or more device capable of being in communication with user device 102, merchant system 104, payment gateway system 106, acquirer system 110, transaction service provider system 112, and/or issuer system 114 via communication network 116. For example, insurer system 108 may include a computing device, such as a server, a group of servers, and/or other like devices. In some non-limiting embodiments or aspects, insurer system 108 may be associated with an insurer institution. For example, an insurer institution may refer to one or more entities that underwrite one or more payment transactions, each payment transaction involving a user (e.g., the user associated with user device 102) and a merchant (e.g., the merchant associated with merchant system 104). In some non-limiting embodiments or aspects, insurer system 108 may be included in one or more other systems illustrated in FIG. 1 (e.g., merchant system 104, payment gateway system 106, acquirer system 110, transaction service provider system 112, and/or issuer system 114).

Acquirer system 110 may include one or more device capable of being in communication with user device 102, merchant system 104, payment gateway system 106, insurer system 108, transaction service provider system 112, and/or issuer system 114 via communication network 116. For example, acquirer system 110 may include a computing device, such as a server, a group of servers, and/or other like devices. In some non-limiting embodiments or aspects, acquirer system 110 may be associated with an acquirer as described herein. In some non-limiting embodiments or aspects, acquirer system 110 may be associated with an acquirer institution that issued a payment account and/or instrument (e.g., a credit account, a debit account, a credit card, a debit card, and/or the like) to a merchant (e.g., a merchant associated with merchant system 104).

Transaction service provider system 112 may include one or more device capable of being in communication with user device 102, merchant system 104, payment gateway system 106, insurer system 108, acquirer system 110, and/or issuer system 114 via communication network 116. For example, transaction service provider system 112 may include a computing device, such as a server, a group of servers, and/or other like devices. In some non-limiting embodiments or aspects, transaction service provider system 112 may be associated with a transaction service provider as described herein.

Issuer system 114 may include one or more device capable of being in communication with user device 102, merchant system 104, payment gateway system 106, insurer system 108, acquirer system 110, and/or transaction service provider system 112 via communication network 116. For example, issuer system 114 may include a computing device, such as a server, a group of servers, and/or other like devices. In some non-limiting embodiments or aspects, issuer system 114 may be associated with an issuer institution that issued a payment account and/or instrument (e.g., a credit account, a debit account, a credit card, a debit card, and/or the like) to a user (e.g., a user associated with user device 102).

In some non-limiting embodiments or aspects, transaction processing network 101 includes a plurality of systems in a communication path for processing a transaction. For example, transaction processing network 101 may include payment gateway system 106, insurer system 108, acquirer system 110, transaction service provider system 112, and/or issuer system 114 in a communication path (e.g., a communication path, a communication channel, a communication network, and/or the like). As an example, transaction processing network 101 may process (e.g., initiate, conduct, authorize, and/or the like) an electronic payment transaction via the communication path between payment gateway system 106, insurer system 108, acquirer system 110, transaction service provider system 112, and/or issuer system 114.

Communication network 116 may include one or more wired and/or wireless networks. For example, communication network 116 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems and/or devices shown in FIG. 1 are provided as an example. There may be additional systems and/or devices, fewer systems and/or devices, different systems and/or devices, or differently arranged systems and/or devices than those shown in FIG. 1. Furthermore, two or more systems and/or devices shown in FIG. 1 may be implemented within a single system or a single device, or a single system or a single device shown in FIG. 1 may be implemented as multiple, distributed systems or devices. Additionally or alternatively, a set of systems or a set of devices (e.g., one or more systems, one or more devices) of environment 100 may perform one or more functions described as being performed by another set of systems or another set of devices of environment 100.

In some non-limiting embodiments or aspects, transaction data associated with a payment transaction may include transaction parameters associated with payment transactions, such as payment transactions initiated and/or conducted with an electronic wallet application, and/or the like. Non-limiting examples of transaction parameters include: electronic wallet card data associated with an electronic card (e.g., an electronic credit card, an electronic debit card, an electronic loyalty card, and/or the like), decision data associated with a decision (e.g., a decision to approve or deny a transaction authorization request), authorization data associated with an authorization response (e.g., an approved spending limit, an approved transaction value, and/or the like), a PAN, an authorization code (e.g., a PIN, etc.), data associated with a transaction amount (e.g., an approved limit, a transaction value, etc.), data associated with a transaction date and time, data associated with a conversion rate of a currency, data associated with a merchant type (e.g., goods, grocery, fuel, and/or the like), data associated with an acquiring institution country, data associated with an identifier of a country associated with the PAN, data associated with a response code, data associated with a merchant identifier (e.g., a merchant name, a merchant location, and/or the like), data associated with a type of currency corresponding to funds stored in association with the PAN, and/or the like.

Figure 2:
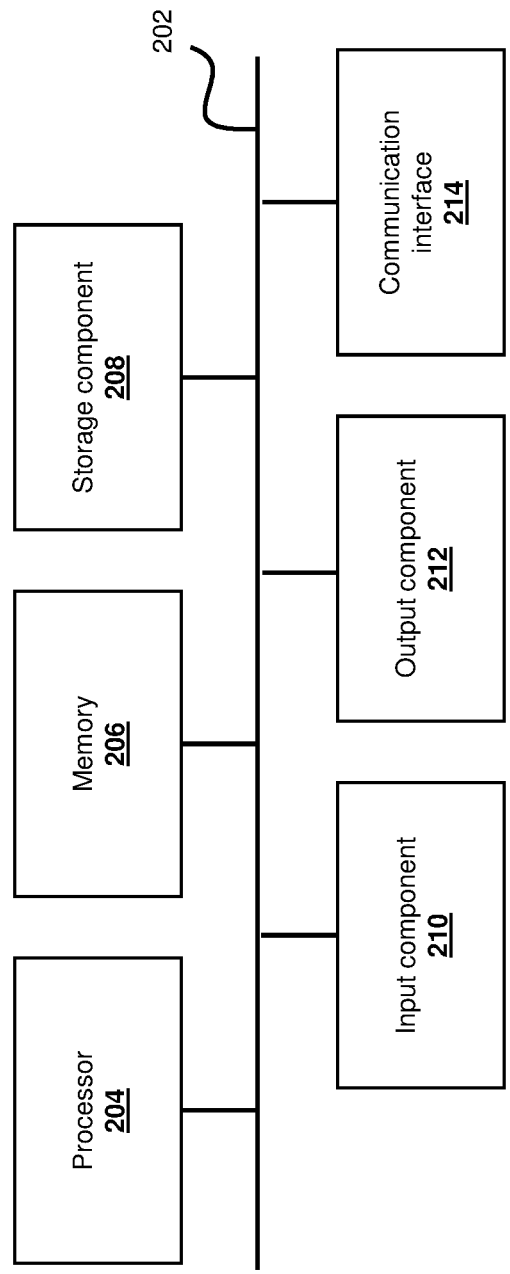
FIG. 2 is a diagram of a non-limiting aspect or embodiment of components of one or more devices and/or one or more systems of FIG. 1.

Referring now to FIG. 2, illustrated is a diagram of example components of device 200. Device 200 may correspond to one or more devices of transaction processing network 101, one or more devices of user device 102, one or more devices of merchant system 104, one or more devices of payment gateway system 106, one or more devices of the insurer system 108, one or more devices of acquirer system 110, one or more devices of transaction service provider system 112, one or more devices of the issuer system 114, and/or one or more devices of the communication network 116. In some non-limiting embodiments or aspects, one or more devices of user device 102, one or more devices of merchant system 104, one or more devices of payment gateway system 106, one or more devices of insurer system 108, one or more devices of acquirer system 110, one or more devices of transaction service provider system 112, one or more devices of issuer system 114, and/or one or more devices of the communication network 116 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
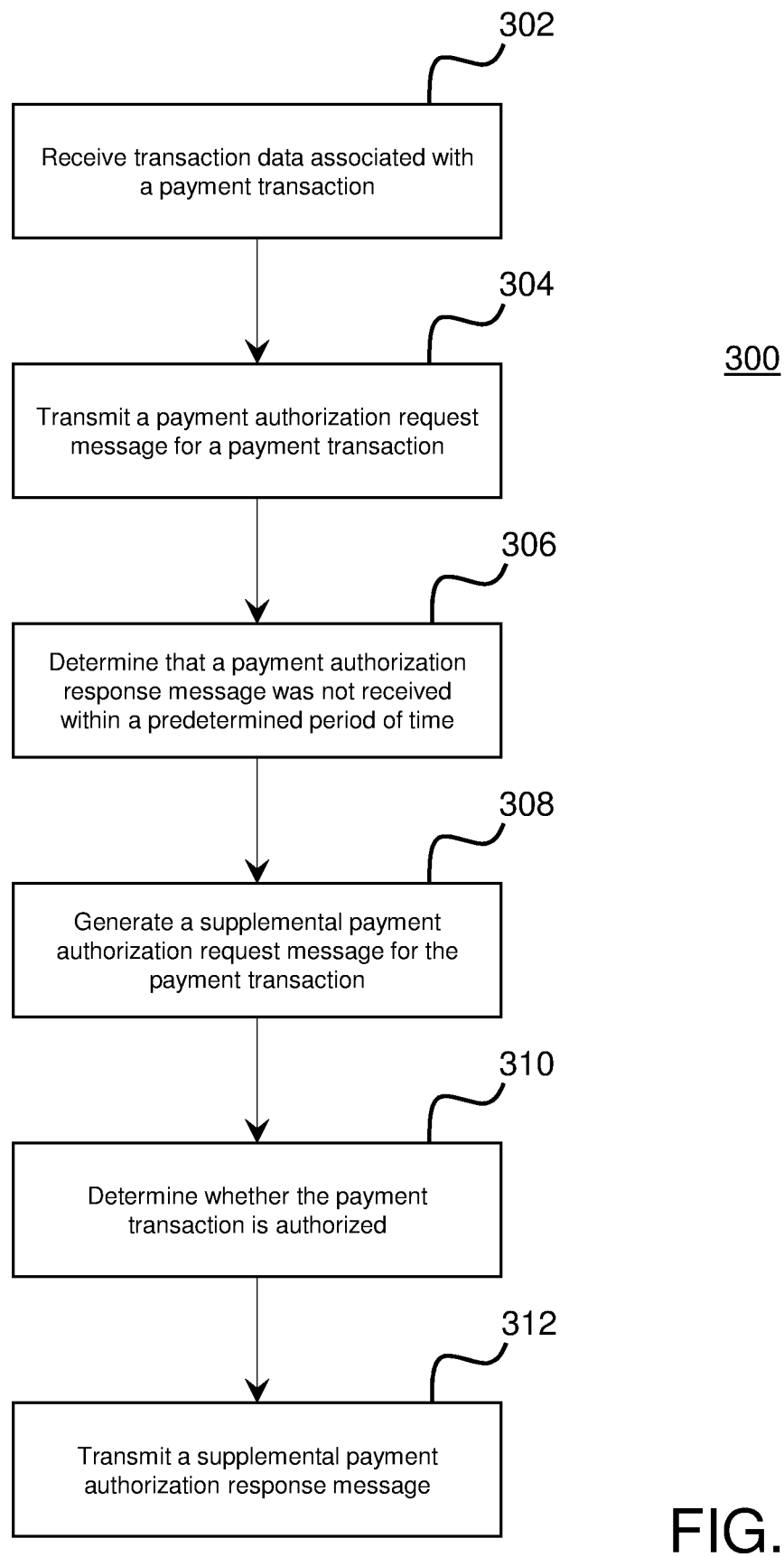
FIG. 3 is a flowchart of a non-limiting aspect or embodiment of a process for guaranteeing a payment authorization response.

Referring now to FIG. 3, illustrated is a flowchart of a non-limiting aspect or embodiment of a process 300 for guaranteeing a payment authorization response. In some non-limiting embodiments or aspects, one or more of the functions described with respect to process 300 may be performed (e.g., completely, partially, etc.) by payment gateway system 106. In some non-limiting embodiments or aspects, one or more of the steps of process 300 may be performed (e.g., completely, partially, and/or the like) by another device or a group of devices separate from and/or including transaction service provider system 112, merchant system 104, insurer system 108, acquirer system 110, and/or issuer system 114.

As shown in FIG. 3, at step 302, process 300 may include receiving transaction data associated with a payment transaction. For example, payment gateway system 106 may receive transaction data associated with a payment transaction. In such an example, payment gateway system 106 may receive the transaction data associated with the payment transaction from merchant system 104 (e.g., based initiation of the transaction by user device 102 at merchant system 104, based on initiation of an e-commerce payment and/or a card-not-present transaction such as a transaction initiated via an website and/or via an electronic wallet involving a user associated with user device 102 and a merchant associated with merchant system 104). In some non-limiting embodiments or aspects, payment gateway system 106 may receive transaction data associated with a plurality of payment transactions (e.g., transaction data associated with a plurality of payment transactions involving one or more users associated with one or more user devices 102-1, 102-2 (collectively referred to as user device 102) and one or more merchants associated with one or more merchant devices 104-1, 104-2 (collectively referred to as merchant device 104).

In some non-limiting embodiments or aspects, payment gateway system 106 may generate a payment authorization request message. For example, payment gateway system 106 may generate one or more payment authorization request messages based on (e.g., in response to) receiving the transaction data associated with one or more payment transactions. The payment authorization request message may include the transaction data associated with the payment transaction.

As shown in FIG. 3, at step 304, process 300 may include transmitting a payment authorization request message for a payment transaction. For example, payment gateway system 106 may transmit a payment authorization request message (e.g., one or more payment authorization request messages) for a payment transaction (e.g., one or more payment transactions) to transaction service provider system 112. The payment authorization request message may include the transaction data associated with the payment transaction (e.g., the one or more payment transactions) and/or data derived from the transaction data associated with the payment transaction. In some non-limiting embodiments or aspects, payment gateway system 106 may transmit a plurality of payment authorization request messages based on receiving transaction data associated with a plurality of payment transactions from one or more merchant systems 104, each of the payment authorization request messages including transaction data associated with one or more transactions from among the plurality of payment transactions that involve one or more transaction service providers and/or one or more issuer institutions.

As shown in FIG. 3, at step 306, process 300 may include determining that a payment authorization response message was not received within a predetermined period of time. For example, payment gateway system 106 may determine that one or more payment authorization response messages were not received from transaction service provider system 112 within a predetermined period of time (e.g., a predetermined period of time after payment gateway system 106 transmitted one or more payment authorization request messages associated with the one or more payment authorization response messages to transaction service provider system 112). In such an example, payment gateway system 106 may determine that a predetermined period of time elapsed after a point in time when the one or more payment authorization request messages were transmitted to transaction service provider system 112. The predetermined period of time may be associated with a period of time during which the transaction service provider system 112 does not communicate with payment gateway system 106 (e.g., due to an error when communication is attempted with transaction service provider system 112, a period of non-responsiveness during communication with transaction service provider system 112, and/or the like).

As shown in FIG. 3, at step 308, process 300 may include generating a supplemental payment authorization request message for the payment transaction. For example, payment gateway system 106 may generate the supplemental payment authorization request message for the one or more payment transactions. In such an example, payment gateway system 106 may generate the supplemental payment authorization request message for the one or more payment transactions based on (e.g., in response to) determining that the one or more payment authorization response messages were not received from transaction service provider system 112. In some non-limiting embodiments or aspects, the supplemental payment authorization request messages may include transaction data associated with the one or more payment transactions, merchant data associated with merchants involved in the payment transactions (e.g., a merchant associated with merchant system 104), and/or user data associated with users involved in the payment transactions (e.g., the user associated with user device 102). In some non-limiting embodiments or aspects, payment gateway system 106 may generate the supplemental payment authorization request message based on the one or more payment authorization request messages. For example, payment gateway system 106 may generate the supplemental payment authorization request message based on data included in the one or more payment authorization request messages (e.g., transaction data associated with one or more payment transactions).

In some non-limiting embodiments or aspects, payment gateway system 106 may generate the supplemental payment authorization request message by aggregating a plurality of payment authorization request messages (e.g., in a tranche including data associated with the one or more payment authorization request messages) for a plurality of payment transactions for which payment authorization response messages were not received from transaction service provider system 112. For example, payment gateway system 106 may generate the supplemental payment authorization request message by aggregating a plurality of payment authorization request messages for a plurality of payment transactions for which payment authorization response messages were not received from transaction service provider system 112 based on payment gateway system 106 receiving transaction data associated with a plurality of payment transactions, payment gateway system 106 generating a plurality of payment authorization request messages based on the plurality of payment transactions, and payment gateway system 106 transmitting the plurality of payment authorization request messages to one or more transaction service provider systems 112. In some non-limiting embodiments or aspects, payment gateway system 106 may determine that the payment authorization response messages were not received based on determining that the payment authorization response messages were not received within a predetermined period of time after a point in time during which corresponding payment authorization request messages were transmitted by payment gateway system 106 to transaction service provider system 112. In some non-limiting embodiments or aspects, payment transactions for which payment authorization response messages were received by payment gateway system 106 from transaction service provider system 112 may be excluded from the aggregated plurality of payment authorization request messages. In some non-limiting embodiments or aspects, payment transactions for which payment authorization response messages were not received by payment gateway system 106 from transaction service provider system 112 may be included in the aggregated plurality of payment authorization request messages.

In some non-limiting embodiments or aspects, the supplemental payment authorization request message may include risk score data associated with a quantitative risk score for one or more payment transactions, and/or transaction data associated with one or more payment transactions. For example, payment gateway system 106 may include risk score data associated with a quantitative risk score for one or more payment transactions, and/or transaction data associated with one or more payment transactions when payment gateway system 106 generates the supplemental payment authorization request message. In some non-limiting embodiments or aspects, the quantitative risk score includes a score associated with whether issuer system 114 would authorize the one or more payment transactions (e.g., once communication is established between payment gateway system 106 and transaction service provider system 112).

In some non-limiting embodiments or aspects, payment gateway system 106 may determine a quantitative risk score (e.g., a score associated with the expected likelihood that an issuer system involved in one or more payment transaction will authorize the one or more payment transactions). For example, payment gateway system 106 may determine the quantitative risk score based on the transaction data associated with the one or more payment transactions, user data associated with the one or more users involved in the one or more payment transactions, and/or merchant data associated with the one or more merchants involved in the one or more payment transactions. In some non-limiting embodiments or aspects, payment gateway system 106 may determine the quantitative risk score based on determining whether one or more of the rules associated with a merchant involved in a payment transaction are satisfied.

In some non-limiting embodiments or aspects, payment gateway system 106 may determine the quantitative risk score based on determining whether the payment transaction satisfies a transaction payment amount threshold (e.g., a value that, when satisfied by a transaction value, indicates whether a payment transaction is associated with a low insurance risk or a high insurance risk). For example, payment gateway system 106 may receive data associated with a transaction payment amount threshold from merchant system 104. In such an example, payment gateway system 106 may determine the quantitative risk score based on determining whether the value of the payment transaction satisfies the quantitative risk score. In some non-limiting embodiments or aspects, payment gateway system 106 may determine the quantitative risk score. For example, payment gateway system 106 may determine the quantitative risk score based on updating the quantitative risk score (e.g., where the quantitative risk score is a floating limit that is adjusted by payment gateway system 106 based on one or more payment transactions that occurred prior). In an example, payment gateway system 106 may determine the quantitative risk score based on comparing the final disposition of one or more previous payment transactions that were insured (e.g., where one or more payment transactions were associated with one or more insurance claim messages that were generated where one or more payment transactions that were insured were not authorized (e.g., by an issuer system)). In such an example, payment gateway system 106 may update the quantitative risk score by decreasing the quantitative risk score based on the one or more payment transactions that were insured not being authorized. In some non-limiting embodiments or aspects, payment gateway system 106 may update the quantitative risk score based on one or more payment transactions involving a merchant, a plurality of merchants, a merchant location associated with a merchant, merchant locations associated with a plurality of merchants, and/or the like.

In some non-limiting embodiments or aspects, payment gateway system 106 may determine the quantitative risk score based on the user associated with user device 102 involved in a payment transaction. For example, payment gateway system 106 may determine the quantitative risk score based on determining that the user involved in the payment transaction is registered (e.g., with payment gateway system 106 and/or insurer system 108). In such an example, the quantitative risk score may be higher where the user involved in the payment transaction is not registered and the transaction payment amount threshold may be lower where the user is registered. In some non-limiting embodiments or aspects, payment gateway system 106 may determine the quantitative risk score based on address data associated with an address of user device 102. For example, payment gateway system 106 may determine the quantitative risk score based on determining that the address of user device 102 is included on a blacklist (e.g., a list of devices for which payment transactions involving the devices should not be insured). In an example, payment gateway system 106 may determine the quantitative risk score based on determining that the location of user device 102 is in an area different from an area associated with merchant system 104 (e.g., where the location of user device 102 is associated with a different state, a different country, and/or the like as compared to the location of merchant system 104). In some non-limiting embodiments or aspects, payment gateway system 106 may determine the quantitative risk score based on shipping data associated with a shipping address for the payment transaction. For example, payment gateway system 106 may determine the quantitative risk score based on comparing the shipping address for the payment transaction to a billing address associated with the user involved in the payment transaction (e.g., the billing address associated with a payment device involved in the payment transaction). In such an example, the quantitative risk score may be lower when the shipping address does not match the billing address and the quantitative risk score may be higher when the shipping address does match the payment address.

In some non-limiting embodiments or aspects, payment gateway system 106 may determine the quantitative risk score based on payment gateway system 106 determining that one or more payment transactions initiated prior were authorized and the one or more payment transactions initiated prior involved the same shipping address. For example, payment gateway system 106 may determine the quantitative risk score based on payment gateway system 106 determining that one or more payment transactions initiated prior were authorized and the one or more payment transactions initiated prior involved the same shipping address, the one or more payment transactions occurring within a predetermined period of time from when the instant payment transaction was initiated.

In some non-limiting embodiments or aspects, payment gateway system 106 may determine the quantitative risk score based on a frequency which user device 102 is involved in payment transactions. For example, payment gateway system 106 may determine the frequency with which user device 102 is involved in payment transactions involving one or more merchants, one or more areas (e.g., in one or more towns, states, countries, and/or the like), and/or the like. In such an example, payment gateway system 106 may determine the frequency with which user device 102 is involved in payment transactions based on historical transaction data associated with one or more historical payment transactions involving the user associated with user device 102 and one or more merchants. Payment gateway system 106 may update the quantitative risk score based on receiving one or more payment transactions that occur in real time (e.g., based on user device 102 initiating one or more payment transactions after payment gateway system 106 determines the quantitative risk score).

In some non-limiting embodiments or aspects, payment gateway system 106 may determine the quantitative risk score based on one or more fingerprints associated with one or more historical payment transactions. For example, payment gateway system 106 may determine the quantitative risk score based on one or more fingerprints associated with one or more historical payment transactions, where the fingerprints indicate that the historical payment transactions received an amount of insurance rates for insuring each historical payment transaction that satisfied or did not satisfy a predetermined threshold. The predetermined threshold may be set by the payment gateway associated with payment gateway system 106, one or more insurers associated with one or more insurer systems 114, and/or the like. In such an example, payment gateway system 106 may determine the quantitative risk score based on fingerprints associated with one or more historical payment transactions where the one or more historical payment transactions are associated with payment transactions involving one or more users and/or one or more merchants (e.g., one or more users from among a plurality of users and/or one or more merchants from among a plurality of merchants), payment transactions involving one or more users and a merchant, payment transactions involving a user and one or more merchants, payment transactions involving user device 102 and one or more merchants, and/or the like.

In some non-limiting embodiments or aspects, payment gateway system 106 may determine the quantitative risk score based on data included in one or more historical claim messages. For example, payment gateway system 106 may determine the quantitative risk score based on one or more historical claim messages that include an indication that one or more historical payment transactions were not approved and/or that one or more payment response messages were not received from transaction service provider system 112 within the further predetermined period of time after the one or more historical payment transactions were initiated. In such an example, payment gateway system 106 may determine the quantitative risk score based on data included in one or more historical claim messages where the one or more historical claim messages are associated with payment transactions involving one or more users and/or one or more merchants (e.g., one or more users from among a plurality of users and/or one or more merchants from among a plurality of merchants), payment transactions involving one or more users and a merchant, payment transactions involving a user and one or more merchants, payment transactions involving user device 102 and one or more merchants, and/or the like.

In some non-limiting embodiments or aspects, payment gateway system 106 may determine the quantitative risk score based on the aggregated plurality of payment transactions.

In some non-limiting embodiments or aspects, payment gateway system 106 may transmit the supplemental payment authorization request message to insurer system 108 (e.g., one or more insurer systems collectively referred to as insurer system 108). For example, payment gateway system 106 may transmit the supplemental payment authorization request message to insurer system 108 after payment gateway system 106 generates the supplemental payment authorization request message. In some non-limiting embodiments or aspects, insurer system 108 may determine whether or not to insure the one or more payment transactions associated with the supplemental payment authorization request message. Where insurer system 108 determines not to insure the one or more payment transactions associated with the supplemental payment authorization request message, insurer system 108 may forego communication with and/or may transmit a message to payment gateway system 106 indicating that the one or more payment transactions associated with the payment authorization request message are not insured. Where insurer system 108 determines to insure the one or more payment transactions associated with the supplemental payment authorization request message, insurer system 108 may generate and transmit insurance response data associated with an insurer rate (e.g., a dynamically adjustable insurance rate (DAIR)) for which insurer system 108 guarantees payment of the one or more payment transactions to a merchant associated with merchant system 104). In such an example, insurer system 108 may determine the insurer rate associated with the insurance response data based on data included in the supplemental payment request message. In some non-limiting embodiments or aspects, the insurer system 108 may be included in transaction service provider system 112. In such embodiments, where communication cannot be established between transaction service provider system 112 and one or more issuer systems 114, transaction service provider system 112 may determine whether one or more payment transactions are insured, thereby reducing the need for additional communication between payment gateway system 106 and an independent insurer system (e.g., insurer system 108).

In some non-limiting embodiments or aspects, insurer system 108 may determine to insure the one or more payment transactions associated with the supplemental payment authorization request message should a chargeback later be processed involving the payment transaction. For example, insurer system 108 may generate and transmit chargeback insurance response data associated with a chargeback insurer rate for which insurer system 108 guarantees payment to a merchant associated with merchant system 104 after a chargeback is processed for the payment transaction. In such an example, insurer system 108 may determine the chargeback insurer rate associated with the insurance response data based on data included in the supplemental payment request message. In some non-limiting embodiments or aspects, the chargeback insurance response data associated with a chargeback insurer rate may be included in the insurance response data.

In some non-limiting embodiments or aspects, where insurer system 108 transmits the insurance response data associated with the insurer rate to payment gateway system 106, payment gateway system 106 may include the insurance response data associated with the insurer rate in a supplemental payment authorization response message. For example, in some non-limiting embodiments or aspects, payment gateway system 106 may select insurer system 108 (e.g., from among a plurality of insurer systems 108 that transmitted insurance response data associated with an insurer rate based on (e.g., in response to) receiving the supplemental payment authorization request message) based on the insurer rate received by payment gateway system 106 (e.g., payment gateway system 106 may select insurer system 108 that provided the lowest insurer rate). In some non-limiting embodiments or aspects, the insurer rate may be the same for each transaction of the one or more transactions included in the supplemental authorization request message. In some non-limiting embodiments or aspects, the insurer rate may be different for one or more transactions of the one or more transactions included in the supplemental authorization request message.

As shown in FIG. 3, at step 310, process 300 may include determining whether the payment transaction is authorized. For example, payment gateway system 106 may determine whether the payment transaction is authorized (e.g., whether the payment transaction is authorized to be included in a supplemental payment authorization request message that is later sent to insurer system 108) based on a quantitative risk score and/or an insurer rate associated with the one or more payment transactions (e.g., the one or more payment transactions associated with the supplemental payment authorization request message). In some non-limiting embodiments or aspects, payment gateway system 106 may determine whether the payment transaction is authorized based on one or more rules associated with a merchant involved in a payment transaction. For example, payment gateway system 106 may determine whether the payment transaction is authorized, for each payment transaction of the payment transactions associated with the supplemental payment authorization request message, based on a rule regarding whether the user involved in the payment transaction is a trusted user (e.g., a customer with that has been involved in one or more previous payment transactions with the merchant involved in the transaction and/or another merchant involved in the one or more previous payment transactions). In another example, payment gateway system 106 may determine whether the payment transaction is authorized based on a rule regarding whether a value associated with the payment transaction satisfies a predetermined threshold (e.g., whether the value of the payment transaction satisfies the predetermined transaction). In another example, payment gateway system 106 may determine whether the payment transaction is authorized based on a rule regarding whether a currency associated with the payment transaction is an approved currency (e.g., whether issuer system 114 is configured to process payment transactions associated with the currency of the payment transaction). In another example, payment gateway system 106 may determine whether the payment transaction is authorized based on a rule regarding whether a value associated with insuring the payment transaction exceeds a predetermined threshold. In another example, payment gateway system 106 may determine whether the payment transaction is authorized based on a rule regarding whether a number of payment transactions were authorized within a time window (e.g., whether a number of payment transactions involving the user associated with user device 102, the merchant associated with merchant system 104, the issuer institution associated with issuer system 114, and/or the like satisfies a transaction amount threshold). In another example, payment gateway system 106 may determine whether the payment transaction is authorized based on a rule regarding whether a location of user device 102 (e.g., a country and/or area associated with the user associated with user device 102 that is determined based on a billing address for the user, a shopping address for the user, a shipping address for the user, an internet protocol (IP) address for the user, and/or the like) is within an area (e.g., an area associated with user device 102). In another example, payment gateway system 106 may determine whether the payment transaction is authorized based on a rule regarding whether the quantitative risk score for the payment transaction satisfies a quantitative risk score threshold. In another example, payment gateway system 106 may determine whether the payment transaction is authorized based on a rule regarding whether the payment transaction is a repeat payment transaction initiated by the user associated with user device 102 (e.g., whether the user associated with user device 102 has initiated a transaction involving the same goods and/or services for purchase during a previous payment transaction). In another example, payment gateway system 106 may determine whether the payment transaction is authorized based on a rule regarding whether the transaction service provider associated with the transaction service provider system 112 involved in the payment transaction is a predetermined transaction service provider. In another example, payment gateway system 106 may determine whether the payment transaction is authorized based on a rule regarding whether a payment instrument involved in the payment transaction is approved by a transaction service provider associated with transaction service provider system 112 and/or an issuer institution associated with issuer system 114. In another example, payment gateway system 106 may determine whether the payment transaction is authorized based on a rule regarding whether one or more items involved in the payment transaction (e.g., plane tickets, shoes, and/or the like) are approved or not approved to be involved in a payment transaction by issuer system 114. In another example, payment gateway system 106 may determine whether the payment transaction is authorized based on a rule regarding whether a shipping address involved in the payment transaction is approved or not approved by issuer system 114.

In some non-limiting embodiments or aspects, payment gateway system 106 may determine that the quantitative risk score corresponds to an accepted risk score (e.g., that the quantitative risk score has a value that falls within a range of accepted risk score values). For example, payment gateway system 106 may determine that the quantitative risk score corresponds to an accepted risk score for a merchant involved in the payment transaction. In some non-limiting embodiments or aspects, payment gateway system 106 may determine that the insurer rate corresponds to an accepted insurer rate (e.g., that the insurer rate has a value that falls within a range of accepted insurer rate values). For example, payment gateway system 106 may determine that the insurer rate corresponds to an accepted insurer rate for a merchant involved in the payment transaction.

As shown in FIG. 3, at step 312, process 300 may include transmitting a supplemental payment authorization response message. For example, payment gateway system 106 may transmit a supplemental payment authorization response message to merchant system 104. In such an example, payment gateway system 106 may transmit the supplemental payment authorization response message to merchant system 104 based on (e.g., in response to) determining that the payment transaction is authorized. In some non-limiting embodiments or aspects, the supplemental payment authorization request message transmitted by payment gateway system 106 to merchant system 104 may include data associated with one or more transactions involving merchant system 104. For example, the supplemental payment authorization request message transmitted by payment gateway system 106 to merchant system 104 may include insurance response data associated with an insurer rate for insuring the payment transaction that involves the merchant associated with merchant system 104.

In some non-limiting embodiments or aspects, payment gateway system 106 may receive a transaction approval message from merchant system 104. For example, payment gateway system 106 may receive the transaction approval message from merchant system 104 based on (e.g., in response to) transmitting the supplemental payment authorization response message to merchant system 104. In such an example, the transaction approval message may include an indication as to whether the payment transaction is approved or not approved by the merchant associated with merchant system 104 (e.g., whether the merchant accepts the insurer rate for the one or more payment transaction issued by the insurer system 108 that was selected). In some non-limiting embodiments or aspects, payment gateway system 106 may determine whether the payment transaction is approved by the merchant associated with merchant system 104. For example, payment gateway system 106 may determine whether the payment transaction is approved by the merchant associated with merchant system 104 based on the indication included in the transaction approval message as to whether the payment transaction is approved or not approved. Where payment gateway system 106 determines that the payment transaction is approved, payment gateway system 106 may process the payment transaction. Where payment gateway system 106 determines that the payment transaction is not approved, payment gateway system 106 may forego processing the payment transaction.

In some non-limiting embodiments or aspects, payment gateway system 106 may process the payment transaction. For example, payment gateway system 106 may process the payment transaction by re-transmitting the payment authorization request message to the transaction service provider system 112. In such an example, payment gateway system 106 may re-transmit the payment authorization request message to transaction service provider system 112 a further predetermined period of time after transmitting the supplemental payment authorization response message to merchant system 104. In some non-limiting embodiments or aspects, payment gateway system 106 may receive a payment authorization response message from the transaction service provider system 112, the payment authorization response message indicating whether the payment transaction is approved or not approved. Where the payment transaction is approved, payment gateway system 106 may transmit a confirmation message to merchant system 104 indicating that the payment transaction was approved (e.g., approved by issuer system 114). In some non-limiting embodiments or aspects, where the payment transaction is not approved, payment gateway system 106 may transmit an insurance claim message for the payment transaction to insurer system 108. For example, payment gateway system 106 may transmit the insurance claim message to insurer system 108, the insurance claim message including an indication that the payment transaction was not approved and/or that a payment response message was not received from transaction service provider system 112 within the further predetermined period of time. In such an example, payment gateway system 106 may receive an insurance claim response message from insurer system 108 including an indication that the payment transaction is approved or not approved. Payment gateway system 106 may then transmit a confirmation message to merchant system 104 indicating that the payment was or was not authorized based on the indication included in the insurance claim response message.

Figure 4B:
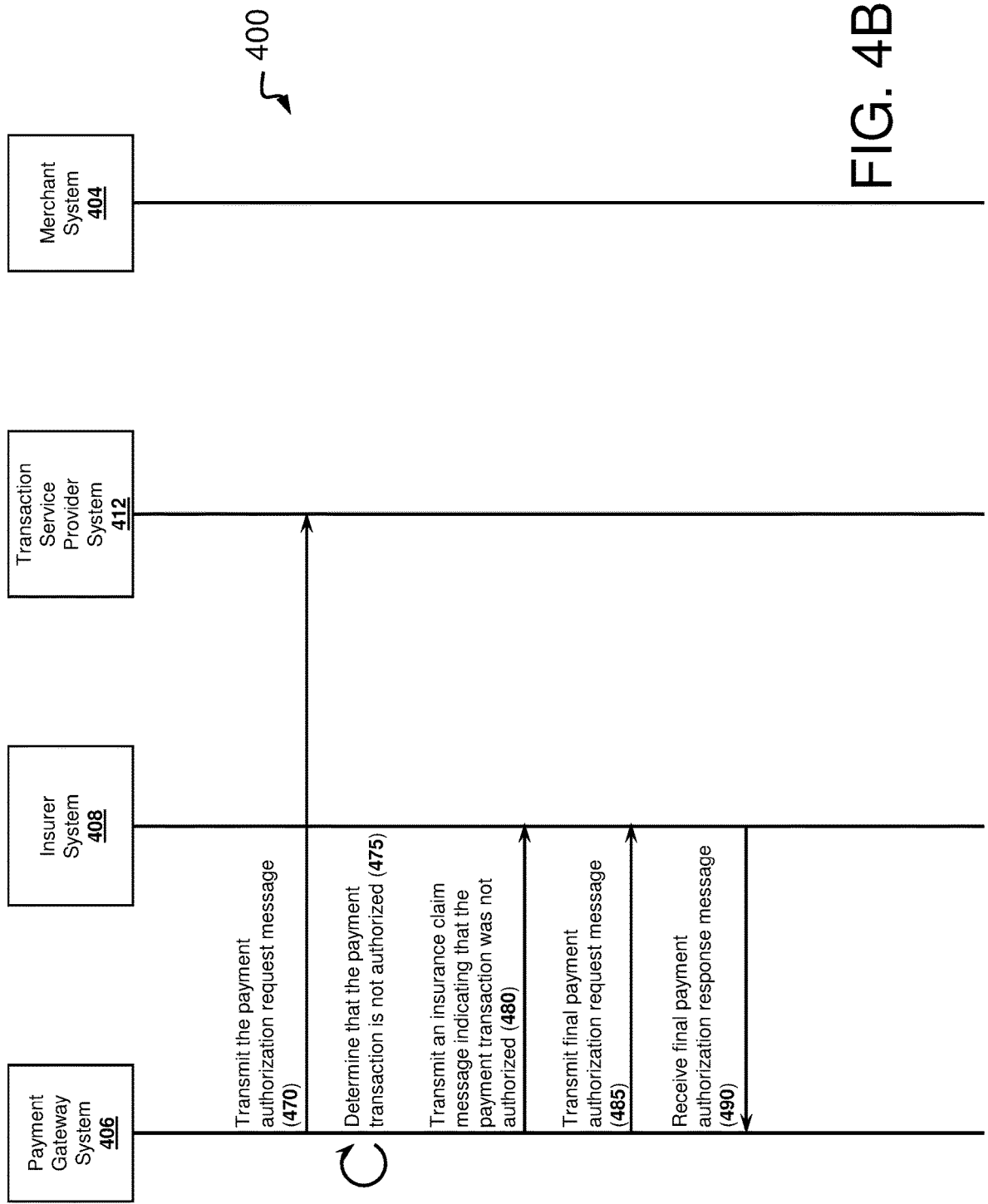

Referring now to FIGS. 4A-4B, illustrated is a flowchart of a non-limiting aspect or embodiment of an implementation 400 relating to a process for guaranteeing a payment authorization response. As illustrated in FIGS. 4A-4B, implementation 400 includes payment gateway system 406, insurer system 408, transaction service provider system 412, and merchant system 404. In some non-limiting embodiments or aspects, payment gateway system 406, insurer system 408, transaction service provider system 412, and merchant system 404 may be the same or similar to payment gateway system 106, insurer system 108, transaction service provider system 112, and merchant system 104, respectively.

As shown by reference number 420 in FIG. 4A, payment gateway system 406 may receive transaction data associated with a payment transaction. For example, payment gateway system 406 may receive the transaction data associated with the payment transaction from merchant system 404. In some non-limiting embodiments or aspects, payment gateway system 406 may be configured to communicate with merchant system 404 in real time. In some non-limiting embodiments or aspects, payment gateway system 406 may be configured to communicate with merchant system 404 via one or more application programmable interfaces (APIs).

As shown by reference number 425 in FIG. 4A, payment gateway system 406 may transmit a payment authorization request message. For example, payment gateway system 406 may transmit the payment authorization request message to transaction service provider system 412. In another example, payment gateway system 406 may transmit the payment authorization request message to an issuer system. The payment authorization request message may include the transaction data associated with the payment transaction and/or data derived from the transaction data associated with the payment transaction.

As shown by reference number 430 in FIG. 4A, payment gateway system 406 may determine that a payment authorization response message (e.g., a payment authorization response message including an indication that the payment transaction is approved or is not approved) was not received. For example, payment gateway system 406 may determine that a predetermined period of time has elapsed since the point in time at which the payment authorization request message was transmitted to the transaction service provider system 412 and, during the predetermined period of time, a payment authorization response message was not received from the transaction service provider system 412.

As shown by reference number 435 in FIG. 4A, payment gateway system 406 may determine a quantitative risk score. For example, payment gateway system 406 may determine the quantitative risk score (e.g., a value between 0-100 that is associated with the expected likelihood that an issuer system involved in one or more payment transaction will authorize the one or more payment transactions, where 0 indicates the payment transaction will not be authorized and 100 indicates that the payment transaction will be authorized) based on the transaction data associated with the payment transaction, merchant data associated with a merchant involved in the payment transaction, and/or user data associated with a user involved in the payment transaction. In some non-limiting embodiments or aspects, payment gateway system 406 may determine whether the payment transaction is eligible for authorization. For example, payment gateway system 406 may determine whether the payment transaction is eligible for authorization based on the quantitative risk score. In such an example, payment gateway system 406 may determine that the payment transaction is eligible for authorization based on determining that the quantitative risk score corresponds to an accepted risk score value. In some non-limiting embodiments or aspects, payment gateway system 406 may determine a quantitative risk score based on receiving transaction data associated with a plurality of payment transactions involving one or more users associated with one or more user devices and one or more payment gateway systems 406 that do not transmit one or more payment authorization responses.

As shown by reference number 440 in FIG. 4A, payment gateway system 406 may generate a supplemental payment authorization request message. For example, payment gateway system 406 may generate a supplemental payment authorization request message based on the payment authorization request message. In some non-limiting embodiments or aspects, the supplemental payment authorization request message may include risk score data associated with the quantitative risk score, the transaction data associated with the payment transaction, the merchant data associated with the merchant involved in the payment transaction, the user data associated with the user involved in the payment transaction (e.g., an identifier of a user associated with a user device involved in the payment transaction, a unique claim code associated with the payment transaction, and/or the like), and/or insurer data associated with an insurer institution that is agreeing to insure the payment transaction (e.g., an insurer code associated with the insurer institution).

As shown by reference number 445 in FIG. 4A, payment gateway system 406 may transmit the supplemental payment authorization request message. For example, payment gateway system 406 may transmit the supplemental payment authorization request message to insurer system 408. In some non-limiting embodiments or aspects, payment gateway system 406 may transmit the supplemental payment authorization request message to a plurality of insurer systems 408.

As shown by reference number 450 in FIG. 4A, payment gateway system 406 may receive insurance response data associated with an insurer rate for insuring the payment transaction. For example, payment gateway system 406 may receive insurance response data associated with an insurer rate for insuring the payment transaction from insurer system 408. In such an example, the insurance response data associated with the insurer rate may be received after insurer system 408 determines to insure the payment transaction and what the insurer rate is for insuring the payment transaction. In some non-limiting embodiments or aspects, payment gateway system 406 may receive insurance response data associated with an insurer rate from one or more insurer systems 408 of the plurality of insurer systems.

As shown by reference number 455 in FIG. 4A, payment gateway system 406 may select insurer system 408 from among the one or more insurer systems that transmitted insurance response data associated with insurer rates to payment gateway system 406. For example, payment gateway system 406 may select insurer system 408 based on determining that insurer system 408 is associated with an insurer rate that is the lowest from among all the insurer rates received from the one or more insurer systems. In some non-limiting embodiments or aspects, payment gateway system 406 may select insurer system 408 based on determining that the insurer rate is within a predetermined range of insurance rates that are identified by the merchant associated with merchant system 404 as being pre-approved (e.g., may be approved without communicating with merchant system 404 to determine whether the payment transaction is approved to be insured).

As shown by reference number 460 in FIG. 4A, payment gateway system 406 may transmit a supplemental payment authorization response message. For example, payment gateway system 406 may transmit the supplemental payment authorization response message to merchant system 404. The supplemental payment authorization response message may include the insurance response data associated with the insurer rate for the payment transaction and/or quantitative risk score data associated with a quantitative risk score.

As shown by reference number 465 in FIG. 4A, payment gateway system 406 may receive a transaction approval message. For example, payment gateway system 406 may receive the transaction approval message from merchant system 404. In such an example, the transaction approval message may include an indication indicating that the insurer rate is accepted or not accepted by the merchant associated with merchant system 404. In some non-limiting embodiments or aspects, payment gateway system 406 may store the transaction approval message in a database.

As shown by reference number 470 in FIG. 4B, payment gateway system 406 may transmit (e.g., retransmit) the payment authorization request message to transaction service provider system 412. In some non-limiting embodiments or aspects, payment gateway system 406 may transmit the payment authorization request message a plurality of times.

As shown by reference number 475 in FIG. 4B, payment gateway system 406 may determine that the payment transaction is or is not authorized. For example, payment gateway system 406 may determine that the payment transaction is or is not authorized based on payment gateway system 406 determining whether a payment authorization response message was received within a predetermined period of time from the point in time at which the payment authorization request message was transmitted (e.g., retransmitted). In some non-limiting embodiments or aspects, where payment gateway system 406 receives a payment authorization response message indicating that the payment transaction is authorized, payment gateway system 406 may transmit a confirmation message to merchant system 404 indicating that the payment was authorized. In some non-limiting embodiments or aspects, payment gateway system 406 may determine that the payment transaction is not authorized. For example, payment gateway system 406 may determine that the payment transaction is not authorized based on payment gateway system 406 determining that a payment authorization response message indicating that the payment transaction is authorized was not received within the predetermined period of time from the point in time at which the payment authorization request message was transmitted. In another example, payment gateway system 406 may determine that the payment transaction is not authorized based on payment gateway system 406 receiving a payment authorization response message from transaction service provider system 412 indicating that the payment transaction is not authorized.

As shown by reference number 480 in FIG. 4B, payment gateway system 406 may transmit an insurance claim message including an indication as to whether the payment transaction was or was not authorized. For example, payment gateway system 406 may transmit an insurance claim message including an indication that the payment transaction was or was not authorized to insurer system 408.

As shown by reference number 485 in FIG. 4B, payment gateway system 406 may transmit a final payment authorization request message (e.g., a capture message to cause funds to be transferred to the account of the merchant involved in the payment transaction). For example, payment gateway system 406 may transmit a final payment authorization request message to insurer system 408 including the transaction data associated with the payment transaction.

As shown by reference number 490 in FIG. 4B, payment gateway system 406 may receive a final payment authorization response message. For example, payment gateway system 406 may receive the final payment authorization response message from insurer system 408. In such an example, the final payment authorization response message may include an indication that the payment transaction is authorized or is not authorized. In some non-limiting embodiments or aspects, the final payment authorization response message may include an indication that the payment transaction is authorized after a predetermined period of time has elapsed (e.g., a predetermined period of time during which an insurance claim may not be processed based on one or more rules associated with the insurer rate). In some non-limiting embodiments or aspects, the final payment authorization response message may include an indication that the payment transaction is not authorized (e.g., where the predetermined period of time during which an insurance claim may not be processed based on the one or more rules associated with the insurer rate has not elapsed). In some non-limiting embodiments or aspects, payment gateway system 406 may transmit a confirmation message to merchant system 404 indicating that the payment transaction was approved or not approved.

Although the above systems, methods, and computer program products have been described in detail for the purpose of illustration based on what is currently considered to be the most practical and preferred embodiments or aspects, it is to be understood that such detail is solely for that purpose and that the present disclosure is not limited to the described embodiments or aspects but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method for guaranteeing a payment authorization response during an e-commerce transaction, the computer-implemented method comprising:
   determining, by a payment gateway system, that a payment authorization response message for a payment transaction was not received from a transaction service provider system within a predetermined period of time after a payment authorization request message for the payment transaction was transmitted to the transaction service provider system;
   in response to determining that the payment authorization response message for the payment transaction was not received, generating, by the payment gateway system, a supplemental payment authorization request message for the payment transaction based on the payment authorization request message;
   transmitting, by the payment gateway system, the supplemental payment authorization request message to a plurality of insurer systems;
   receiving, by the payment gateway system, insurance response data associated with insurer rates for which the plurality of insurer systems guarantees payment of the payment transaction;
   selecting, by the payment gateway system, an insurer system from among the plurality of insurer systems to insure the payment transaction based on the insurer rates; and
   determining, by the payment gateway system, that the payment transaction is authorized based on a quantitative risk score associated with the supplemental payment authorization request message and an insurer rate associated with the selected insurer system; and
   transmitting, by the payment gateway system, a supplemental payment authorization response message to a merchant system based on determining that the payment transaction is authorized.

2. The computer-implemented method according to claim 1, further comprising:
   receiving, with at least one processor, a transaction approval message from the merchant system based on the supplemental payment authorization response message;
   determining, with at least one processor, that the payment transaction is approved by the merchant; and
   processing, with at least one processor, the payment transaction.

3. The computer-implemented method according to claim 2, wherein processing the payment transaction comprises:
   re-transmitting, with at least one processor, the payment authorization request message to the transaction service provider system after transmitting the supplemental payment authorization response message to the merchant system;
   receiving, with at least one processor, a payment authorization response message from the transaction service provider system; and
   transmitting, with at least one processor, a confirmation message to the merchant system based on the payment authorization response message.

4. The computer-implemented method according to claim 2, wherein processing the payment transaction comprises:
   re-transmitting, with at least one processor, the payment authorization request message to the transaction service provider system;
   receiving, with at least one processor, a payment response message from the transaction service provider system indicating that the payment transaction is denied; and
   transmitting, with at least one processor, an insurance claim message for the payment transaction to the selected insurer system.

5. The computer-implemented method according to claim 1, wherein determining that the payment transaction is authorized based on the quantitative risk score associated with the supplemental payment authorization request message and the insurer rate associated with the supplemental payment authorization request message comprises:
   determining, with at least one processor, that the quantitative risk score corresponds to an accepted risk score value for payment transactions processed by the merchant system and that the insurer rate associated with the supplemental payment authorization request message corresponds to an accepted insurer rate value.

6. The computer-implemented method according to claim 1, wherein generating the supplemental payment authorization request message for the payment transaction based on the payment authorization request message comprises:
   aggregating, with at least one processor, a plurality of payment authorization request messages for a plurality of payment transactions for which payment authorization response messages were not received from the transaction service provider system;
   determining, with at least one processor, that the payment authorization response messages were received; and
   generating, with at least one processor, the supplemental payment authorization request message based on determining that the payment authorization response messages were not received, wherein the supplemental payment authorization request message comprises the quantitative risk score and the insurer rate, the quantitative risk score and the insurer rate determined based on the plurality of payment authorization request messages.

7. A system for guaranteeing a payment authorization response during an e-commerce transaction, the system comprising:

a payment gateway system programmed or configured to:
  determine that a payment authorization response message for a payment transaction was not received from a transaction service provider system within a predetermined period of time after a payment authorization request message for the payment transaction was transmitted to the transaction service provider system;
  generate a supplemental payment authorization request message for the payment transaction based on the payment authorization request message;
  transmit the supplemental payment authorization request message to a plurality of insurer systems;
  receive insurance response data associated with insurer rates for which the plurality of insurer systems guarantees payment of the payment transaction;
  select an insurer system from among the plurality of insurer systems to insure the payment transaction based on the insurer rates;
  determine that the payment transaction is authorized based on a quantitative risk score associated with the supplemental payment authorization request message and an insurer rate associated with the selected insurer system; and
  transmit a supplemental payment authorization response message to a merchant system based on determining that the payment transaction is authorized, the supplemental payment authorization response message comprising:
    at least a portion of the insurance response data associated with the insurer rate for which the selected insurer system guarantees payment of the payment transaction.

8. The system according to claim 7, wherein the at least one processor is further programmed or configured to:
  receive a transaction approval message from the merchant system based on the supplemental payment authorization response message;
  determine that the payment transaction is approved by a merchant associated with the merchant system; and
  process the payment transaction.

9. The system according to claim 8, wherein, when processing the payment transaction, the at least one processor is programmed or configured to:
  re-transmit the payment authorization request message to the transaction service provider system after transmitting the supplemental payment authorization response message to the merchant system;
  receive a payment authorization response message from the transaction service provider system including an indication that the payment transaction is authorized; and
  transmit a confirmation message to the merchant system based on the payment authorization response message.

10. The system according to claim 8, wherein, when processing the payment transaction, the at least one processor is programmed or configured to:
  re-transmit the payment authorization request message to the transaction service provider system;
  receive a payment response message from the transaction service provider system including an indication that the payment transaction is denied; and
  transmit an insurance claim message for the payment transaction to the selected insurer system.

11. The system according to claim 7, wherein, when determining that the payment transaction is authorized based on the quantitative risk score associated with the supplemental payment authorization request message and the insurer rate associated with the supplemental payment authorization request message, the at least one processor is programmed or configured to:
  determine that the quantitative risk score corresponds to an accepted risk score value for payment transactions processed by the merchant system and that the insurer rate associated with the supplemental payment authorization request message corresponds to an accepted insurer rate value.

12. The system according to claim 7, wherein, when generating the supplemental payment authorization request message for the payment transaction based on the payment authorization request message, the at least one processor is programmed or configured to:
  aggregate a plurality of payment authorization request messages for a plurality of payment transactions for which payment authorization response messages were not received from the transaction service provider system;
  determine that the payment authorization response messages were received; and
  generate the supplemental payment authorization request message based on determining that the payment authorization response messages were not received, wherein the supplemental payment authorization request message comprises the quantitative risk score and the insurer rate.

13. A payment gateway system comprising at least one non-transitory computer-readable medium including one or more instructions that, when executed by at least one processor, cause the at least one processor to:
  determine that a payment authorization response message for a payment transaction was not received from a transaction service provider system after a predetermined period of time has elapsed;
  in response to determining that the payment authorization response message for the payment transaction was not received, generate a supplemental payment authorization request message for the payment transaction based on a payment authorization request message;
  in response to generating the supplemental payment authorization request message, transmit the supplemental payment authorization request message to a plurality of insurer systems;
  receive insurance response data associated with insurer rates for which the plurality of insurer systems guarantees payment of the payment transaction;
  select an insurer system from among the plurality of insurer systems to insure the payment transaction based on the insurer rates;
  determine that the payment transaction is authorized based on a quantitative risk score associated with the supplemental payment authorization request message and an insurer rate associated with the selected insurer system; and
  transmit a supplemental payment authorization response message to a merchant system based on determining that the payment transaction is authorized, the supplemental payment authorization response message comprising:
    at least a portion of the insurance response data associated with the insurer rate for which the selected insurer system of the plurality of insurer systems guarantees payment of the payment transaction.

14. The computer program product according to claim 13, wherein the one or more instructions further cause the at least one processor to:
- receive a transaction approval message from the merchant system based on the supplemental payment authorization response message;
- determine that the payment transaction is approved by a merchant associated with the merchant system; and
- process the payment transaction.

15. The computer program product according to claim 14, wherein the one or more instructions that cause the at least one processor to process the payment transaction cause the at least one processor to:
- re-transmit the payment authorization request message to the transaction service provider system after transmitting the supplemental payment authorization response message to the merchant system;
- receive a payment authorization response message from the transaction service provider system including an indication that the payment transaction is approved; and
- transmit a confirmation message to the merchant system based on the payment authorization response message.

16. The computer program product according to claim 14, wherein the one or more instructions that cause the at least one processor to process the payment transaction cause the at least one processor to:
- re-transmit the payment authorization request message to the transaction service provider system;
- receive a payment response message from the transaction service provider system including an indication that the payment transaction is denied; and
- transmit an insurance claim message for the payment transaction to the insurer system.

17. The computer program product according to claim 13, wherein the one or more instructions that cause the at least one processor to determine that the payment transaction is authorized based on the quantitative risk score associated with the supplemental payment authorization request message and the insurer rate associated with the supplemental payment authorization request message cause the at least one processor to:
- determine that the quantitative risk score corresponds to an accepted risk score value for payment transactions processed by the merchant system and that the insurer rate associated with the supplemental payment authorization request message corresponds to an accepted insurer rate value.

18. The computer program product according to claim 13, wherein the one or more instructions that cause the at least one processor to generate the supplemental payment authorization request message for the payment transaction based on the payment authorization request message cause the at least one processor to:
- aggregate a plurality of payment authorization request messages for a plurality of payment transactions for which payment authorization response messages were not received from the transaction service provider system;
- determine that the payment authorization response messages were received;
- and generate the supplemental payment authorization request message based on determining that the payment authorization response messages were not received, wherein the supplemental payment authorization request message comprises the quantitative risk score and the insurer rate.

* * * * *

UNITED STATES PATENT AND TRADEMARK OFFICE
CERTIFICATE OF CORRECTION

Page 1 of 1

PATENT NO. : 11,144,919 B2
APPLICATION NO. : 16/655793
DATED : October 12, 2021
INVENTOR(S) : Gurpreet Singh Bhasin et al.

It is certified that error appears in the above-identified patent and that said Letters Patent is hereby corrected as shown below:

In the Claims

Column 37, Claim 14, Line 1, delete "computer program product" and insert -- payment gateway system --

Column 37, Claim 15, Line 1, delete "computer program product" and insert -- payment gateway system --

Column 37, Claim 16, Line 1, delete "computer program product" and insert -- payment gateway system --

Column 38, Claim 17, Line 1, delete "computer program product" and insert -- payment gateway system --

Column 38, Claim 18, Line 1, delete "computer program product" and insert -- payment gateway system --

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*